Figures 1, 2:
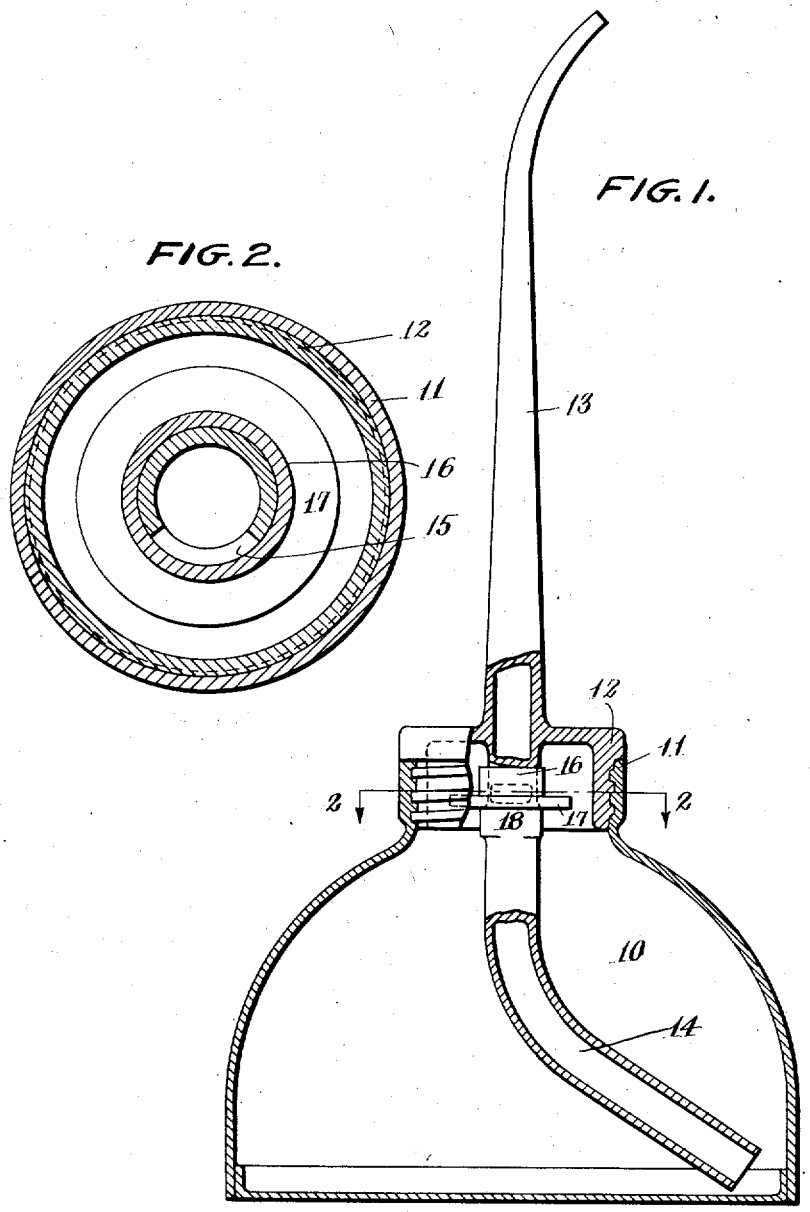

H. W. MUHLEISEN.

OIL CAN.

APPLICATION FILED MAY 28, 1918.

Reissued Dec. 24, 1918. 14,578.

INVENTOR

Henry W. Muhleisen

BY

J. A. Edmonds

ATTORNEY

UNITED STATES PATENT OFFICE.

HENRY W. MUHLEISEN, OF LOS ANGELES, CALIFORNIA, ASSIGNOR TO ALBERT P. WORTHINGTON, OF LOS ANGELES, CALIFORNIA.

OIL-CAN.

14,578. Specification of Reissued Letters Patent. Reissued Dec. 24, 1918.

Original No. 1,255,833, dated February 5, 1918, Serial No. 174,773, filed June 14, 1917. Application for reissue filed May 28, 1918. Serial No. 237,129.

*To all whom it may concern:*

Be it known that I, HENRY W. MUHLEISEN, a citizen of the United States, residing at Los Angeles, in the county of Los Angeles and State of California, have invented new and useful Improvements in Oil-Cans, of which the following is a specification.

This invention relates to a container and particularly pertains to an oil can.

When using oil cans of the spring bottom type it is practically impossible to force oil from the can when the stem is in an upright position and in cases where this result has been attained it has been difficult to draw oil from the container when it is nearly empty and inverted. It is the principal object of this invention to provide means whereby oil may be ejected from the can regardless of the inclination of the stem and the quantity of oil within the container.

Another object of this invention is to provide an oil can having a simple stem construction, the parts of which may be easily manufactured and assembled.

Another object of this invention is to provide an automatically operating valve member which is mounted upon the stem and may open and close an auxiliary stem opening when the can is inverted.

It is a further object of this invention to provide an oil can of the above class which is simple in its construction, not liable to become broken, or otherwise rendered inoperative and will operate in a positive manner.

Other objects will appear hereinafter.

The invention is illustrated, by way of example, in the accompanying drawings in which:

Figure 1 is a view in section and elevation illustrating a completely assembled oil can constructed according to the spirit of the present invention; and Fig. 2 is an enlarged view in transverse section, as seen on the line 2—2 of Fig. 1, and particularly discloses the valve member and the stem opening normally closed thereby.

Referring more particularly to the drawings, 10 indicates the reservoir, or can within which the oil, or other liquid is placed. This can is of any desired sectional shape and has a reduced neck 11 which is threaded to receive a stem cap 12. The cap 12 is provided with an oiling spout 13 which extends outwardly from the end of the cap and through the end to form a stem 14. The stem 14 is tubular and bent downwardly to terminate within the corner of the can formed by the side wall and bottom. It will be noted that the bend of the stem is in the same direction as the bend on the end of the spout and will thus insure that practically all of the oil will be ejected from the can. An opening 15 is formed through the tubular stem at a point slightly below the upper wall of the cap 12. This opening is normally closed by a sliding valve collar 16, which encircles the stem and is fitted with an outwardly extending flange 17 adapted to aid the collar in slipping from over the opening when the stem is inverted. In order that the valve member will normally cover the opening 15, a shoulder 18 is formed upon the stem and supports the valve, as particularly shown in Fig. 1.

In operation, the can 10 is filled with a liquid and thereafter the cap 12 is secured in position. When this is done the stem 14 will extend downwardly into the liquid. Pressure upon the bottom of the can will force the liquid upwardly through the stem and out the spout. This action will take place even though the spout is in a vertical position. When the can is inverted the valve collar 16 will act by gravity and the weight of the oil upon the flange to slide the collar downwardly against the end of the cap 12, thus uncovering the opening 15 in the stem, and allowing the oil to flow through the opening and out the spout, even though the quantity of oil within the can is very small and the end of the stem is not submerged in the oil.

It will thus be seen that the device here disclosed will operate effectively to eject oil from the spout, irrespective of its inclination and without regard to the quantity of oil within the can.

While I have shown the form of my oil can as now known to me, it is evident that various changes in the combination, construction and arrangement of parts may be made by those skilled in the art without departing from the spirit of my invention.

What I claim is:—

1. An oil can comprising a reservoir having a spring bottom, a spout communicating with said can, and means whereby liquid may be caused to pass through said spout irrespective of whether the can is in upright vertical or inverted position, and of whether the quantity of liquid in said reservoir is large or small in relation to the size of said reservoir.

2. An oil can comprising a reservoir having a spring bottom, a spout communicating with said can, a tubular stem forming an extension of said spout and extending a substantial distance into said reservoir, said stem having an opening therethrough at a point adjacent the junction of the stem with the spout, and means whereby said opening may be closed when the can is in an upright position and open when it is inverted.

3. An oil can comprising a reservoir having a spring bottom and a top portion, a spout extending through said top portion, a tubular stem forming an extension of said spout and extending into said reservoir to a point adjacent the bottom thereof, said stem having an opening therethrough at a point adjacent said top portion, and a member mounted on said stem to close said opening when the can is in an upright position and to open it when the can is inverted.

4. An oil can comprising a reservoir having a spring bottom and a top portion, a spout extending through said top portion, a tubular stem forming an extension of said spout and extending into said reservoir, said stem having an opening therethrough at a point adjacent said top portion, and a shoulder below said opening, and a collar seated on said shoulder to cover said opening when the can is right side up, said collar being adapted to slide into position to uncover said opening when the can is inverted.

5. An oil can comprising a reservoir having a spring bottom, a spout detachably secured to the top of said reservoir, a tubular stem in communication with said spout and extending into the reservoir, its end terminating within a corner of the reservoir formed by its side wall and the bottom, an opening through the stem at a point adjacent the juncture of the stem with the spout, and means whereby said opening may be closed when the can is in an upright position and open when it is inverted.

6. An oil can comprising a reservoir having a spring bottom, a spout detachably secured to the top of said reservoir, a tubular stem in communication with said spout and extending into the reservoir, its end terminating within a corner of the reservoir formed by its side wall and the bottom, an opening through the stem at a point adjacent the juncture of the stem with the spout, and a slidable collar circumscribing said stem to close the opening therein when the can is disposed in an upright position and to uncover said opening when the can is inverted.

7. A container comprising a can having a spring bottom and within which a liquid may be placed, a spout in communication with said can, means whereby liquid may be ejected from the can irrespective of the inclination of the spout, and a gravity operated valve adapted to open when the can is inverted and through which the liquid may flow to the spout.

This specification signed and witnessed this 8th day of May, 1918.

HENRY W. MUHLEISEN.

Witnesses:
H. S. LAUGHLIN,
C. R. IRWIN.